Feb. 15, 1927.
C. MACBETH ET AL
1,617,340
PREPARING RUBBER COATED FABRICS
Filed March 19, 1926     3 Sheets-Sheet 1
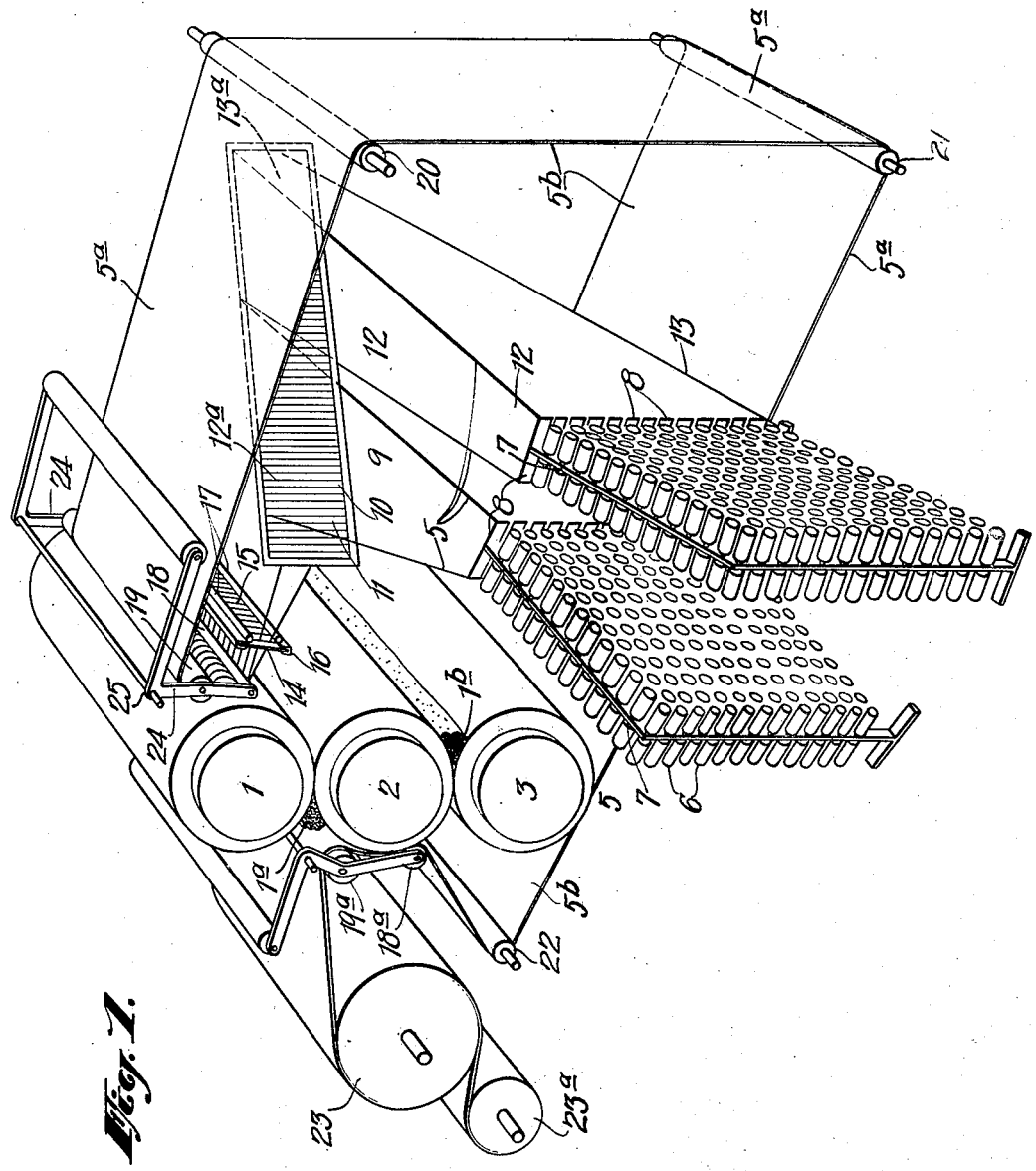
Inventors
COLIN MACBETH
WALLACE JOHN DEXTER.
By their Attorney

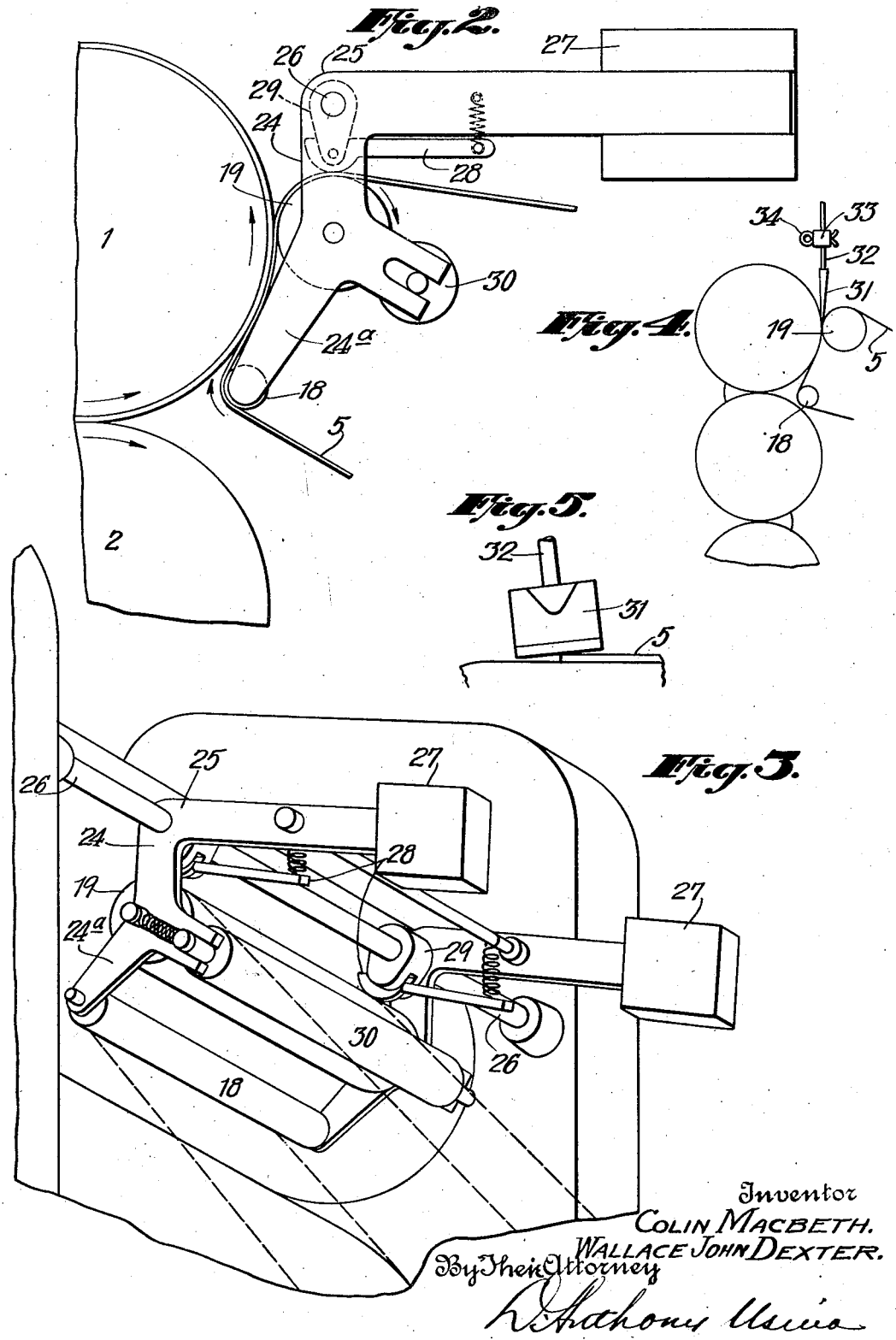

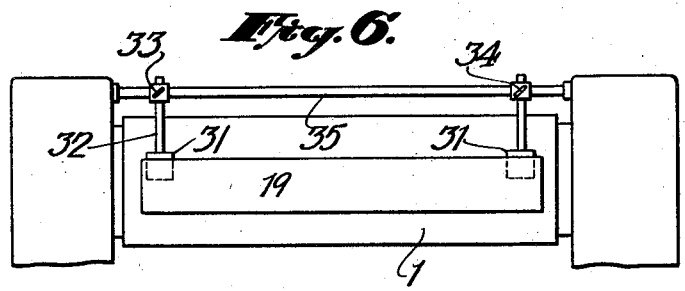
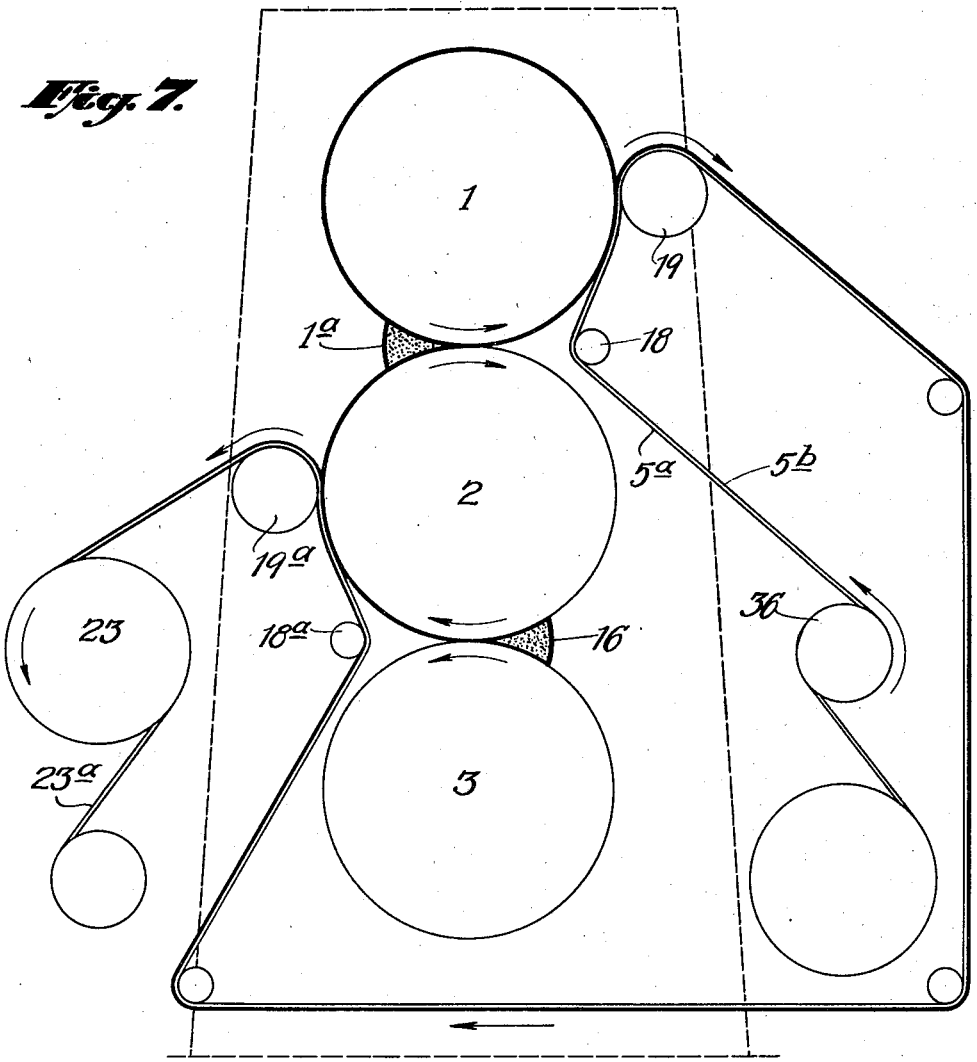

Patented Feb. 15, 1927.

1,617,340

UNITED STATES PATENT OFFICE.

COLIN MACBETH, OF FOUR OAKS, AND WALLACE JOHN DEXTER, OF ERDINGTON, BIRMINGHAM, ENGLAND, ASSIGNORS TO DUNLOP TIRE AND RUBBER CORPORATION OF AMERICA, OF BUFFALO, NEW YORK, A CORPORATION OF NEW YORK.

PREPARING RUBBER-COATED FABRIC.

Application filed March 19, 1926, Serial No. 95,862, and in Great Britain February 2, 1925.

This invention relates to the preparation of rubber coated fabrics and apparatus therefor.

In the preparation of such fabric, it has heretofore been customary to pass it between two of the bowls of a calender where it meets with a film of calendered rubber which is caused to adhere to the said fabric by the pressure of the calender bowls.

To coat the fabric simultaneously on both sides, it has been necessary to utilize a four bowl calender, rubber being inserted at the nip of the first and second bowls and the third and fourth bowls respectively. The fabric was passed between the second and third bowls and thus both of its sides were caused to contact with a rubber film.

Such a calender is expensive and not always available and in many cases it has been found advisable to substitute a three bowl calender therefor, rubber being inserted between the nip of the first and second bowls and the fabric passed between the second and third bowls. Thus only one side of the fabric contacted the rubber film and it was necessary to reverse the fabric and repeat the operation in order to apply a coating of rubber to the opposite side thereof.

This dual operation necessarily added to the cost of coating a fabric on both sides and one of the objects of the present invention is to provide means whereby a three bowl calender may be utilized to apply a coating of rubber to both sides of a fabric in one operation, that is to say, in one continuous passage to and from the calender in which passage opposed surfaces of the said fabric are successively brought into contact with films or sheets of rubber formed upon the surfaces of two of the calender bowls.

A further object of the invention is to provide means whereby strands, threads or cords of textile material may be substituted for the aforementioned fabric and themselves be formed into a weftless fabric by the application of a coating of rubber to each surface thereof.

According to the embodiment of the invention illustrated, we utilize a calender of known type comprising three bowls arranged vertically one above the other and we insert rubber at the nip of the first and second bowls from one side of the calender, and from the opposite side thereof we insert rubber at the nip of the second and third (or lowest) bowls. Thus we form two films of rubber one each upon opposite sides of the calender and we provide means whereby the fabric is so guided that one surface is brought into contact with one of the said films of rubber and subsequently its opposite surface is caused to contact with the other and similar films of rubber formed upon the other bowl and upon the opposite side of the said calender. The illustration shows also means whereby strands, threads or cords of textile material are arranged in parallel relationship side by side in sheet like formation and then guided by the means hereinbefore referred to, successively into contact with the films of rubber formed upon the aforesaid calender bowls.

The accompanying drawings illustrate embodiments of the invention:

Fig. 1 is a perspective view illustrating our invention in use on unwoven or weftless fabric.

Fig. 2 is a side view of a modification of the rubber transference mechanism showing trimming knives and a trimming batching device.

Fig. 3 is a perspective view of Fig. 2.

Figs. 4, 5 and 6 illustrate an alternative trimming scheme.

Fig. 7 shows diagrammatically our invention in use on woven fabric.

Referring first to Fig. 1 which illustrates a method of practising our invention on unwoven or weftless fabric, we utilize an existing calender of the hereinbefore referred to type (known as a three bowl calender) and we insert rubber at the nip $1^a$ of the bowls 1 and 2 and, at the opposite side of the calender, at the nip $1^b$ of the bowls 2 and 3.

We provide means to arrange the individual cords 5, side by side in sheet like formation, and to present one side $5^a$ of the same to the rubber film on the bowl 1 from the nip $1^a$ and the opposite side $5^b$ thereof to the rubber film on the bowl 2 from the nip $1^b$.

One means of arranging the cords in sheet like formation is illustrated in Fig. 1, but it will be readily understood that we do not limit ourselves to this arrangement. A plurality of spools 6 carrying individual cords 5 are rotatably mounted upon spindles projecting from both sides of the two frames 7 of a V-shaped creel. The said spools 6 are arranged in tiers, as shown in Fig. 1, on the frames, and arranged at right angles across the end of each tier and slightly above the level of the spools is a plate or plates 8 provided with holes equal to the number of spools on one tier, i. e. one complete layer of four rows of spools. The cords 5 pass through the said holes and from thence to a collecting frame 9 placed at an angle of 45 degrees to both the centre line of the creel and the axis of the calender bowls. Such an arrangment is preferred because of its consequent space saving and accessibility, but it will be readily understood that the angle may be varied even to the extent of placing the creel in direct alignment with the calender bowls—its centre at right angles to the axis thereof. The said frame 9 is of known type, and is provided with holes equal to the number of spools on the complete creel. The said frame as shown in Fig. 1 is constructed of contiguous plates 10 equal to the number of spools on one tier. Each plate is provided with vertically arranged holes 11 equal to the number of tiers. Thus is formed an arrangement of holes in horizontal and vertical rows, the former containing holes equal to the number of spools in a tier, the latter, holes equal to the number of tiers. The cords from each tier pass through their appropriate horizontal row of holes—the first tier 12 through the first row 12$^a$, and the last tier 13 through the last row 13$^a$—and from thence to a further guiding reed 14 placed parallel to the axis of the calender bowl and arranged at a suitable angle to the plane of the cords as shown in Fig. 1. The said reed—of known type—is composed of a plurality of wires 15, spaced apart the thickness of one, two or more cords as required, and arranged vertically between two bars 16 provided with skids 17 for the higher and lower tiers of cords. By this arrangement of creel and reeds, the vertical depth of the cord formation is gradually decreasing from several feet at the creel end to a few inches at the final guiding reed 14. The process of laying the cords side by side in sheet like formation is finally completed by the roller or skid 18.

From the said roller 18 the cord is passed over a roller 19 which causes its side 5$^a$ to contact with the rubber film on the surface of the bowl 1, whence it is passed beneath the calender,—guided thereunder by idler rollers 20, 21 and 22—and finally passed over rollers 18$^a$ and 19$^a$ which cause its opposite side 5$^b$ to contact with the rubber on the face of the bowl 2, whence it is passed to a drum 23 there to be batched up.

A lining 23$^a$ may be inserted, either as illustrated in Fig. 7 or between the roller 18$^a$ and the fabric, to prevent the adhesion of successive strata wound upon the other drum.

Referring to the embodiment of the invention shown in Figs. 1 and 7, means are provided to press a roller 19 toward the bowl 1 so as to insure good adhesion of the rubber to one side, for example, 5$^a$ of the cord. Similar mechanism is provided for a roller 19$^a$ for the purpose of applying the rubber to the opposite side 5$^b$ of the fabric.

Means are also provided for forcing the fabric into contact with the rubber under pressure. One such means as shown in Figs. 1, 2 and 3 consist in mounting the roller 19 between the arms 24 of a pair of crank levers 25 pivoted at 26 on the frame of the calender, and each provided at its opposite end with a weight 27. This arrangement also facilitates the initial threading of the fabric over the rollers 18 and 19.

Means are provided for presenting a length of the fabric to the rubber film, the increased abrasive action thus attained tending to increase adhesion of rubber to cord. Such means may consist in the arrangement of rollers, illustrated in Figs. 1, 2 and 3 which causes the fabric to make arcuate contact with the rubber film and enables it to be presented to the said film tangentially, so that it gradually makes more and more intimate contact therewith.

The preferred means, Figs. 1, 2 and 3 consist in extending the arms 24 of the lever 25 and providing between the ends of the said extensions 24$^a$ the further roller or skid 18, so that a length of cord substantially equal to the distance between the two rollers 18 and 19 is presented to the film of rubber upon the bowl 1. Thus, to some extent, the rubber is made to adhere to the cord before it is finally pressed thereonto by the pressure roller 19.

When the cord train received its motion by frictional contact with the calender bowl, arcuate contact serves the purpose of increasing the frictional area under the influence or the calender bowl's rotation. Alternatively the rollers 18 and/or 19 may be power driven, but this is not shown in the drawings.

So that the fabric may be completely coated—from edge to edge—the rubber film is allowed to overlap its edges and means are provided to cut away the surplus overlap, and to dispose of the resultant trimmings—to collect them, so that they may be again fed to the nip of the calender bowls.

As shown in Figs. 2 and 3 a pair of spring pressed knives 28 adapted to sever the rubber film immediately past the fabric edge are pivotally mounted in brackets 29 attached to opposite ends of the pivot 26 which spans the calender bowls. To collect the trimmings we provide a spring loaded roller 30 adapted to be rotated by frictional contact with the roller 19 and so to batch up the said trimmings automatically.

Alternatively, we may provide a knife 31, Figs. 4, 5 and 6 adapted to scrape the said overlap away from the fabric, and to deposit it upon the edges of the calender bowls, from whence it is hand stripped at intervals and refed to the rubber bank at the nip of the bowls, or the trimmings may be guided back to the said nip again in known manner. As shown in Figs. 4 and 6 the said knife is affixed to a handle 32 slidably mounted in brackets 33 to enable the precise adjustment of the knife over the fabric edge to be attained as shown in Fig. 5. Set screws 34 are provided to lock the knife in that position. The said brackets 33 are slidably mounted on a bar 35 spanning the calender bowls to allow for endwise adjustment.

The foregoing description is confined to a method of applying our invention to unwoven—or weftless—cord, but it will be readily understood that the same may be adapted for use on woven fabric.

Fig. 7 illustrates diagrammatically a method of practising our invention on woven fabric. It will be readily understood that we do not limit ourselves to this arrangement of threading. We reel off the said fabric from a known type of drum 36 and immediately pass it over the rollers 18 and 19, whence the process is identical with that already described for weftless cord.

The term fabric used in the specification and claims is intended to include a multiplicity of substantially parallel warped cords whether or not they are bound or woven together by the use of weft cords.

Various modifications of the embodiment illustrated may be made by those skilled in the art without departing from the invention as defined in the following claims.

What we claim is:

1. An apparatus for applying a rubber coating to a fabric comprising three aligned calender bowls, a pair of guide rolls at one side of the top bowl arranged to position the fabric for co-operation with a film of rubber on said bowl, pivoted arms supporting said guide rolls and means coacting with said arms for pressing them toward the top calender bowl, means for holding the fabric out of contact with the third bowl and guide rollers carried by pivoted arms for positioning the fabric for coaction with a film of rubber on the second bowl.

2. An apparatus for applying a rubber coating to a cord fabric including in combination a calender bowl arranged to have a film of rubber applied thereto, guides for positioning a multiplicity of aligned cords in juxtaposition to said calender bowl, spaced rollers over which said cords pass, a pivoted member for supporting said spaced rollers and means coacting with said member tending to press the spaced rollers toward said calender bowl.

In witness whereof, we have hereunto signed our names.

COLIN MACBETH.
WALLACE JOHN DEXTER.